United States Patent [19]

Utsumi

[11] Patent Number: 4,876,137
[45] Date of Patent: Oct. 24, 1989

[54] POLYETHYLENE NAPHTHALATE FILM FOR HIGH-DENSITY MAGNETIC RECORDING MEDIA OF FLOPPY DISK

[75] Inventor: Shigeo Utsumi, Yokohama, Japan

[73] Assignee: Diafoil Company, Limited, Tokyo, Japan

[21] Appl. No.: 98,319

[22] Filed: Sep. 18, 1987

Related U.S. Application Data

[63] Continuation-in-part of Ser. No. 941,837, Dec. 15, 1986, abandoned.

[30] Foreign Application Priority Data

Dec. 17, 1985 [JP] Japan ................................ 60-283843

[51] Int. Cl.$^4$ .............................................. G11B 5/64
[52] U.S. Cl. .................................. 428/141; 264/210.7; 264/288.4; 264/290.2; 427/128; 428/480; 428/694; 428/900
[58] Field of Search ............... 428/480, 694, 900, 141; 264/290.2, 209.5, 210.7, 288.4, 291; 427/128

[56] References Cited

U.S. PATENT DOCUMENTS

| | | | |
|---|---|---|---|
| 2,968,065 | 1/1962 | Gronholz | 18/12 |
| 3,461,199 | 8/1969 | Campbell | 264/289 |
| 3,683,060 | 8/1972 | Tanabe et al. | 264/290.2 |
| 4,042,569 | 8/1977 | Bell et al. | 264/289 |
| 4,198,458 | 4/1980 | Mitsuishi et al. | 428/900 |
| 4,226,826 | 10/1980 | Motegi et al. | 264/235.8 |
| 4,230,658 | 10/1980 | Matsukura et al. | 264/290.2 |
| 4,234,532 | 11/1980 | Motegi et al. | 264/235.8 |
| 4,370,291 | 1/1983 | Kazama et al. | 264/290.2 |
| 4,461,797 | 7/1984 | Adachi et al. | 428/480 |
| 4,481,231 | 11/1984 | Hashimoto et al. | 427/44 |
| 4,508,782 | 4/1985 | Miura et al. | 428/480 |
| 4,571,361 | 2/1986 | Kawaguchi et al. | 428/328 |
| 4,587,071 | 5/1986 | Minami et al. | 264/290.2 |
| 4,590,119 | 5/1986 | Kawakami et al. | 428/694 |
| 4,617,164 | 10/1986 | Kanesaki et al. | 264/290.2 |
| 4,619,855 | 10/1986 | Okita et al. | 428/193 |
| 4,619,869 | 10/1986 | Kiriyama et al. | 428/900 |
| 4,732,799 | 3/1988 | Sakamoto et al. | 428/480 |

FOREIGN PATENT DOCUMENTS

| | | |
|---|---|---|
| 0061769 | 10/1982 | European Pat. Off. |
| 86302 | 8/1983 | European Pat. Off. |
| 0123258 | 10/1984 | European Pat. Off. |
| 0135451 | 3/1985 | European Pat. Off. |
| 2320118 | 11/1974 | Fed. Rep. of Germany |
| 5434207 | 3/1979 | Japan |
| 563430 | 1/1981 | Japan |
| 57-64516 | 4/1982 | Japan |
| 1476407 | 6/1977 | United Kingdom |
| 2042929 | 10/1980 | United Kingdom |
| 2091631 | 8/1982 | United Kingdom |

OTHER PUBLICATIONS

Patent Abstracts of Japan, vol. 7, No. 266, p. 239(1411) (Japanese Pat. Appln. Laid–Open (Kokai) 58–146022(1983)).

Japanese Patent Application Laid–Open (Kokai) No. 59–127730 (1984).

*Primary Examiner*—Paul J. Thibodeau
*Attorney, Agent, or Firm*—Oblon, Spivak, McClelland, Maier & Neustadt

[57] ABSTRACT

Disclosed herein is a polyethylene naphthalate film for high-density magnetic recording media of floppy disk which has little anisotropy, high mechanical strength and good dimensional stability, and which scarcely causes a drop out and has good productivity.

11 Claims, 1 Drawing Sheet

POLYETHYLENE NAPHTHALATE FILM FOR HIGH-DENSITY MAGNETIC RECORDING MEDIA OF FLOPPY DISK

CROSS-REFERENCE TO RELATED APPLICATION

The present application is a continuation-in-part application of U.S. patent application Ser. No. 941,837 filed Dec. 15, 1986 now abandoned.

BACKGROUND OF THE INVENTION

The present invention relates to polyethylene naphthalate film for high-density magnetic recording media of floppy disk. The present invention particularly relates to a polyethylene naphthalate film for high-density magnetic recording media of floppy disk which has little anisotropy, high mechanical strength and good dimensional stability, and which scarcely causes a drop out and has good productivity. More particularly, the present invention relates to a polyethylene naphthalate film which has a tensile stress at 5% elongation (hereinunder referred to as "F-5 value") in the range of 13 kg/mm$^2$ to 21 kg/mm$^2$ in any direction on the film; a Young's modulus in the range of 500 kg/cmm$^2$ to 800 kg/mm$^2$ in any direction on the film; a heat shrinkage of less than 2.5% in any direction; a center line average roughness Ra of not more than 0.012 μm and not more than 10 coarse protuberances of not lower than 1.08 μm per 25 cm$^2$, wherein each of the deviations of the F-5 values, Young's moduli and heat shrinkages is not more than 20%.

A magnetic recording disk is obtained by forming a magnetic layer on the surface of a base film by applying magnetic particles together with a binder, or coating the surface of the base film with magnetic metal by vacuum deposition, sputtering or plating. Demand for high-density recording on such magnetic recording media of floppy disk has recently been increasing. With such an increasing demand for high-density recording of floppy disk, much importance has been taken on the improvements of the heat resistance, physical properties (tensile stress at 5% elongation, Young's modulus, heat shrinkage, etc.), and the isotropy for magnetic recording media. If a magnetic recording medium is made of a base film insufficient in isotropy, namely, a base film having much anisotropy, it twists, causes thermal strain, or is inferior in toughness, so that it is unsuitable for high-density recording and reproduction. Furthermore, with a tendency to high-density recording, a film is required to have evenness. However, mere reduction in the surface roughness does not bring about a highly densified magnetic recording material. That is, it is necessary to reduce the number of the coarse protuberances as well as the surface roughness in order to prevent drop outs.

Polyethylene terephthalate films have conventionally been used as a base film for floppy disk. Improvements of these films have also been attempted to meet the demand for high-density magnetic recording media. Polyethylene terephthalate, however, does not have sufficient heat resistance, and it is difficult both to reduce the anisotropy of the film and to increase its mechanical strength. Thus, a film which possesses all the properties required for a high-density magnetic recording medium of floppy disk has been strongly demanded.

On the other hand, since polyethylene naphthalate which has a naphthalene ring in a molecular chain has a rigid molecular structure and exhibits a high crystallizability, a film formed of this material is expected to be excellent in heat resistance, mechanical strength and dimensional stability, and a magnetic recording medium adopting a polyethylene-2,6-naphthalate film as a base film and its manufacturing method have already been proposed (Japanese Patent Publication No. 48-29541 (1973), Japanese Patent Application Laying-Open (KOKAI) No. 50-45877 (1975) and Japanese Patent Publication No. 56-19012 (1981)). However, since these polyethylene-2,6-naphthalate films disclosed in the prior art are insufficient in isotropy of the mechanical properties, they are unsatisfactory to be used as a base film for a high-density magnetic recording medium of floppy disk.

As a result of various researches of the present inventor to provide a film suitable as a base film for a high-density magnetic recording medium of floppy disk it has been found that a film obtained by providing a substantially non-oriented polyethylene naphthalate film with specific properties by means of sequential biaxial orientation, in other words, a polyethylene naphthalate film which has an F-5 value in the range of 13 kg/mm$^2$ to 21 kg/mm$^2$ in any direction on the film; a Young's modulus in the range of 500 kg/mm$^2$ to 800 kg/mm$^2$ in any direction on the film; a heat shrinkage of less than 2.5% in any direction; a center line average roughness Ra of not more than 0.012 μm and not more than 10 coarse protuberances of not lower than 1.08 μm per 25 cm$^2$, wherein each of the deviations of the F-5 values, Young's moduli and heat shrinkages is not more than 20% possesses all the properties required for a base film for a high-density magnetic recording medium of floppy disk. The present invention has been accomplished on the basis of this finding.

SUMMARY OF THE INVENTION

In the first aspect of the present invention, provided is a biaxially oriented polyethylene naphthalate film of not less than 30 μm in the thickness for highdensity magnetic recording media of floppy disks which has a tensile stress at 5% elongation in the range of 13 kg/mm$^2$ to 21 kg/mm$^2$ in any direction on the film; a Young's modulus in the range of 500 kg/mm$^2$ to 800 kg/mm$^2$ in any direction on the film; a heat shrinkage of less than 2.5% in any direction on the film; a center line average roughness Ra of not more than 0.012 μm and not more than 10 coarse protuberances of not lower than 1.08 μm high per 25 cm$^2$, wherein each of the deviations of said tensile stresses at 5% elongation, Young's moduli and heat shrinkages is not more than 20%.

In the second aspect of the present invention, provided is a process for producing a biaxially oriented polyethylene naphthalate film of not less than 30 μm in the thickness for high-density magnetic recording media of floppy disk which has a tensile stress at 5% elongation in the range of 13 kg/mm$^2$ to 21 kg/mm$^2$ in any direction on the film; a Young's modulus in the range of 500 kg/mm$^2$ to 800 kg/mm$^2$ in any direction on the film; a heat shrinkage of less than 2.5% in any direction on the film; a center line average roughness Ra of not more than 0.012 μm and not more than 10 coarse protuberances of not lower than 1.08 μm high per 25 cm$^2$, wherein each of the deviations of said tensile stresses at 5% elongation, Young's moduli and heat shrinkages is not more than 20%, comprising the steps of:

forming an unstretched film by melt-extrusion of a polyethylene naphthalate which contains inactive fine particles, stretching said unstretched film in the machine direction by 3.5 to 5.0 times at a temperature of 130° to 170° C., stretching said film in the transverse direction by 3.5 to 5.0 times at the ratio of 95–105% of that in the machine direction at a temperature of 130° to 180° C., and heatsetting said film at a temperature of 180° to 270° C. for 1 second to 10 minutes.

In the third aspect of the present invention, provided is a process for producing a biaxially oriented polyethylene naphthalate film of not less than 30 μm in the thickness for high-density magnetic recording media of floppy disks which has a tensile stress at 5% elongation in the range of 13 kg/mm$^2$ to 21 kg/mm$^2$ in any direction on the film; a Young's modulus in the range of 500 kg/mm$^2$ to 800 kg/mm$^2$ in any direction on the film; a heat shrinkage of less than 2.5% in any direction on the film; a center line average roughness Ra of not more than 0.012 μm and not more than 10 coarse protuberances of not less than 1.08 μm high per 25 cm$^2$, wherein each of the deviations of said tensile stresses at 5% elongation, Young's moduli and heat shrinkages is not more than 20%, comprising the steps of:

forming a laminated film comprising a polyethylene naphthalate intermediate layer which contains substantially no fine particles except for 0.1 to 3 wt % carbon black and two polyethylene naphthalate surface layers which contain inactive fine particles by co-extruding a polyethylene naphthalate which contains inactive fine particles and a polyethylene naphthalate which contains substantially no fine particles except for 0.1 to 3 wt % carbon black, stretching said laminated film in the machine direction by 3.5 to 5.0 times at a temperature of 130° to 170° C., stretching said film in the transverse direction by 3.5 to 5.0 times at the ratio of 95–105% of that in the machine direction at a temperature of 130° to 180° C., and heatsetting said film at a temperature of 180° to 270° C. for 1 second to 10 minutes.

In the fourth aspect of the present invention, provided is a floppy disk comprising a biaxially oriented polyethylene naphthalate film of not less than 30 μm in the thickness which has a tensile stress at 5% elongation in the range of 13 to 21 kg/mm$^2$ in any direction on the film; a Young's modulus in the range of 500 to 800 kg/mm$^2$ in any direction on the film; a heat shrinkage of less than 2.5% in any direction on the film; a center line average roughness Ra of not more than 0.012 μm and not more than 10 coarse protuberances of not lower than 1.08 μm high per 25 cm$^2$, wherein each of the deviations of said tensile stresses at 5% elongation, Young's moduli and heat shrinkages is not more than 20%, and a magnetic layer formed thereon.

BRIEF DESCRIPTION OF THE DRAWING

The FIGURE is a scheme showing the angular distribution of the F-5 values of films. The reference numeral 1 represents the angular distribution of a conventional film, 2 that of the film according to the present invention, and the symbol TD represents the transverse direction and MD the machine direction.

DETAILED DESCRIPTION OF THE INVENTION

Figure 1:
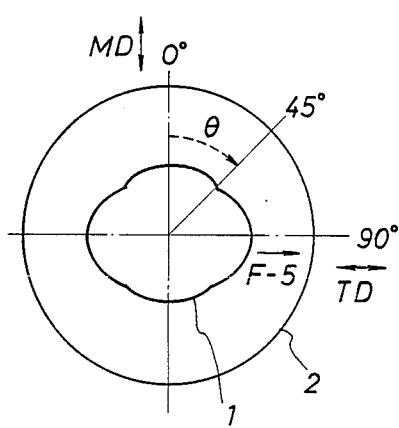

The present invention relates to polyethylene naphthalate film for high-density magnetic recording media of floppy disk. The present invention, particularly relates to a polyethylene naphthalate film for high-density magnetic recording media of floppy disk which has little anisotropy, high mechanical strength and good dimensional stability, and which scarcely causes a drop out and has good productivity.

The polyethylene naphthalate in the present invention means polyethylene naphthalates, preferably polyethylene-2,6-naphthalate, or a polymer containing not less than 70 wt % polyethylene naphthalates, preferably polyethylene-2,6-naphthalate. A copolymer containing a ethylene naphthalate unit as a main constitutional unit, or a mixture of a polyethylene naphthalate with other polyesters which does not substantially impair the characteristics of a polyethylene naphthalate is also usable in the present invention. The polyethylene naphthalate may contain a stabilizer such as phosphoric acid, phosphorous acid and an ester thereof. The intrinsic viscosity (measured in a mixed solvent of phenol and 1,1,2,2-tetrachloroethane in the weight ratio of 1:1, at 30° C.) of the polyethylene naphthalate is preferably 0.5 to 1.0 and more preferably 0.55 to 0.9.

The polyethylene naphthalate film according to the present invention is a biaxially oriented film having the following properties:

1. The F-5 value (tensile stress at 5% elongation) in any direction on the film is in the range of 13 kg/mm$^2$ to 21 kg/mm$^2$, preferably 15 to 21 kg/mm$^2$. A film of an F-5 value of less than 13 kg/mm$^2$ can be obtained from polyethylene terephthalate and there is no advantage in using expensive polyethylene naphthalate. On the other hand, if the F-5 value is more than 21 kg/mm$^2$, since production of a polyethylene naphthalate by sequential biaxial stretching is difficult, it is necessary to adopt simultaneous biaxial orientation, which disadvantageously greatly reduces the film formation speed, resulting in rise in cost.

2. The Young's modulus in any direction on the film is in the range of 500 kg/mm$^2$ to 800 kg/mm$^2$, preferably 500 to 750 kg/mm$^2$. If the Young's modulus is less than 500 kg/mm$^2$, the dimensional stability with respect to external force is poor, and such a film can be produced from polyethylene terephthalate, making the use of an expensive polyethylene naphthalate meaningless. If the Young's modulus is more than 800 kg/mm$^2$ on the other hand, the productivity of film formation is degraded by, for example, deterioration of the evenness of the film or frequent breakage of the film in biaxial stretching.

3. The heat shrinkage in any direction is less than 2.5%, preferably not more than 2.0% at 150° C. A film having a heat shrinkage of not less than 2.5% is unsuitable as a base film for a high-density magnetic recording medium of floppy disk.

4. The deviation of F-5 values is not more than 20%, preferably not more than 10%, more preferably not more than 5%. The deviation of Young's moduli is not more than 20%, preferably not more than 10%, more preferably not more than 7%. The deviation of heat shrinkage is not more than 20%, preferably not more than 19%, more preferably not more than 18%. The deviation means the value (%) obtained by subtracting the minimum value from the maximum value, dividing the difference by the maximum value and multiplying the quotient by 100. If any of the deviations is larger than 20%, the film is unsuitable as a base film for a high-density magnetic recording medium of floppy disk which is required to have isotropy.

"A film having little anisotropy" in the present invention means not only a film having the similar values of the physical properties (F-5 value, Young's modulus and heat shrinkage) in the machine direction and the transverse direction but also a film having similar values in any direction on the film. That is, the angular distribution curve of the values of each physical property obtained at various angles (generally measured at every 5 degrees) on the film is in the above-described range at any angle.

Since the value of each physical property is ordinarily symmetric with respect to a center on the film, the anisotropy of the film will be explained by using the values of the physical properties measured at angles ($\theta$) of 0° (in the machine direction), 45°, and 90° (in the transverse direction) with reference to the FIGURE.

In the FIGURE, the reference numeral 1 represents the angular distribution of the F-5 values of a conventional film and 2 that of the film according to the present invention. The curve 1 is a typical example showing large anisotropy in which the values in the transverse direction (TD) and those in the machine direction (MD) are different, and the curve is concave in the direction of 45° degrees. The curve 2 is a typical example showing a very little anisotropy, and the F-5 values are much larger than those of the curve 1.

5. The center line average surface roughness Ra is not more than 0.012 $\mu$m, preferably not more than 0.008 $\mu$m. It is necessary to provide the surface of the film with an appropriate roughness by adding inactive (inert) fine particles in order to provide a good workability during the production of a magnetic recording medium of floppy disk and to make a magnetic recording medium of floppy disk turn smoothly.

One of the methods of providing the surface of the film with an appropriate roughness is a method of separating fine particles by reacting a metal compound which is disolved in a reaction system, for example, after the ester interchange reaction, with a phosphoric compound during the preparation of a polyethylene naphthalate. This method is called a deposited particle method and is preferable because it produces little coarse particles.

What is called a particle addition method is an easier method. This is a method of mixing inactive fine particles in a step between the step for preparing a polyethylene naphthalate and the step for extruding for the film formation. As the inactive fine particles, the fine particles of kaolin, talc, silica, magnesium carbonate, calcium carbonate, barium carbonate, calcium sulfate, barium sulfate, lithium phosphate, calcium phosphate, magnesium phosphate, aluminum oxide, silicon oxide, titanium oxide, lithium fluoride, Ca, Ba, Zn and Mn salts of terephthalic acid and of carbon blacks are exemplified. Such inactive fine particles may be used singly or used as mixture of two or more members selected from the above described group. These inactive fine particles may be spherical, bulky, or flaky in shape, and there is no special restriction in the hardness, specific gravity, color or the like of the inactive fine particles, either. The primary particle diameter of the inactive fine particles is 0.001 to 1.5 $\mu$m, preferably 0.01 to 1.0 $\mu$m. The amount of the fine particles to be mixed to the film is 0.01 to 1 wt %, preferably 0.02 to 0.8 wt %, and more preferably 0.03 to 0.5 wt %. It is particularly preferable to use simultaneously small particles having a primary particle diameter of 0.001 to 0.5 $\mu$m together with large particles having a primary particle diameter of 0.4 to 1.0 $\mu$m. As the small particles, titanium oxide, silica, etc. are preferable and mixing amount thereof is 0.03 to 0.5 wt %. As the large particles, calcium carbonate is preferable and mixing amount thereof is 0.001 to 0.05 wt %.

6. The number of coarse protuberances of not lower than 1.08 $\mu$m is not more than 10, preferably not more than 5 per 25 cm$^2$. Even if Ra is not more than 0.012 $\mu$m, a coarse protuberance causes a drop out, which induces an error during recording or reproduction. In order to lessen the coarse protuberance in a polyethylene terephthalate film, a method of filtering out the coarse particles through a filter in the extrusion step for film formation is generally adopted. In the case of a polyethylene naphthalate film, however, since the melt viscosity is high, a larger filtering pressures is required in comparison with the filtration of a polyethylene terephthalate film. Since the clogging of the filter requires even larger filtering pressure, it is therefore necessary to replace the filter frequently, thereby reducing the productivity during the film formation. Alternatively, the filtering area may be enlarged to a great extent. In this method, however, a dead space is produced in passing the polymer through the filter, and the deteriorated polymer remaining in the dead space is mixed into the film and causes breakage of the film, resulting in the reduction in productivity during the film formation. Another method is a method of removing the coarse particles after the preparation of a polyethylene naphthalate and before cutting into chips prior to the step of film formation. For example, there are a method of filtering the molten polymer at the time of discharging from the polymerization vessel, and a method of filtering the polymer after it has been cut into chips and when it is extruded again by an extruder in the form of chips. Although these methods are adaptable to the filtration of a small amount of polymer, they are not effective enough for film formation in a large industrial scale of mass production.

The present inventor has found that a film having few coarse protuberances on the surface thereof can be obtained without the above-described problems by adopting a method of laminating thin layers which contain the inactive fine particles on both surfaces of an intermediate layer which contains substantially no inactive fine particles except for a small amount of carbon black by a co-extrusion method.

Since the intermediate layer which occupies the larger part of the film contains substantially no inactive fine particles except for a small amount of carbon black, filtration is not needed. Even if filtration is necessary, a very coarse filter which is rarely clogged can be used, thereby dispensing with the need for replacement. On the other hand, since the layers containing the inactive fine particles only form the surfaces of the film, the amount to be extruded is small and requires only a low filtering pressure, thereby prolonging the lifetime of the filter.

As the filter, a leaf disc type filter which has a large filtering area is preferable. Woven wire, sintered woven wire, or a sintered metal filter may be preferably used. Granular filters made of materials such as metal grains, sand, glass beads and wire are not preferable because such filters are difficult to reuse. The mesh size of the filter is different depending on the kind of magnetic recording media, but is preferably 100 to 10,000 mesh, more preferably 1,000 to 10,000 mesh.

The ratio of thickness of the surface layer and the intermediate layer of the biaxially oriented polyethylene naphthalate film according to the present invention is 2:75 to 4:1 and the total thickness of the film is preferably not less than 30 μm. The two surface layers preferably have the same thickness. If the surface layer is too thin the roughness of the surface layer inconveniently becomes non-uniform, while too thick surface layer disadvantageously makes the long use of the filter, which is one of the object of the present invention, difficult.

It is necessary to form a thin magnetic layer for the purpose of high-density magnetic recording of floppy disk. It is well known that such a thin magnetic layer reduces the difference in the light transmittance between the positioning index hole of a magnetic disk and the film, resulting in production of an error. To prevent this, it has been desired to enhance the light-screening property of the film itself. Adoption of the above-described co-extrusion method can easily meet such a demand by using polyethylene naphthalate containing a carbon black as the intermediate layer.

The carbon black used in the present invention is not specially limited, but lamp black, thermal black, furnace black, acetylene black, etc. are preferable. The particle size is preferably 0.001 to 1 μm in primary particle diameter, and the amount to be added is preferable 0.1 to 3 wt %.

The polyethylene naphthalate film according to the present invention which is superior in the heat resistance, mechanical strength and dimensional stability to a conventional polyethylene terephthalate film, and which has little anisotropy in the film face, low surface roughness and few coarse protuberances is produced, for example, in the following process.

A polyethylene naphthalate (polymer I) which contains inactive fine particles such as silica, titanium oxide and calcium carbonate, and optionally contains stabilizer, coloring agent, defoaming agent, organic lubricant and additive such as polyalkyl glycol is prepared by an ordinary method, pelletized and dried. It is preferable to filter the molten polymer through a filter of 100 to 10,000 mesh to remove coarse particles when discharged from the polymerization vessel or when pelletized by an extruder.

In order to obtain a single-layer film, a pellet of the polymer I is melt-extruded at 280° to 320° C., filtered through a filter of 100 to 10,000 mesh, extruded into a film and cooled to be hardened on a casting drum by, for example, an electrostatic cooling method, thereby obtaining an unstretched film.

It is possible, if necessary, to obtain an unstretched three-layered film comprises the surface layers of the polymer I and the intermediate layer of a polymer II in the following process.

A polymer II which contains substantially no inactive fine particles except for a carbon black is produced, pelletized and dried by an ordinary method. The pellet of the polymer I and the pellet of the polymer II are co-extruded by separate extruders, thereby laminating polymer I on the both surfaces of the layer of the polymer II and the laminated film is cooled to be hardened on a casting drum. At this time, a fine-meshed filter of 1,000 to 10,000 mesh is used in the extruder for the polymer I, while a coarser-meshed filter of 100 to 3,000 mesh is used in the extruder for the polymer II.

In order to obtain a biaxially oriented film of not less than 30 μm in the thickness, an unstretched single-layer or three-layered film obtained in the above-described process is first stretched in the machine direction by 3.5 to 5.0 times at a temperature of 130° to 170° C., and next in the transverse direction by 3.5 to 5.0 times at the ratio of 95 to 105% of that in the machine direction at a temperature of 130° to 180° C., and is heatset at 180° to 270° C. for 1 second to 10 minutes. During heatsetting, the film may be subjected to relaxation in the transverse direction by 1 to 30%, or after heatsetting the film may be subjected to relaxation in the machine direction by 1 to 30%.

The biaxially oriented polyethylene naphthalate film according to the present invention obtained in the above ways has a film thickness of 30 to 125 μm, preferably 30 to 100 μm, an F-5 value in the range of 13 kg/mm$^2$ to 21 kg/mm$^2$ in any direction on the film, a Young's modulus in the range of 500 kg/mm$^2$ to 800 kg/mm$^2$ in any direction on the film, a heat shrinkage of less than 2.5% in any direction on the film, a center line average roughness Ra of not more than 0.012 μm, and not more than 10 coarse protuberances of not lower than 1.08 μm per 25 cm$^2$, wherein each of the deviations of the F-5 values, Young's moduli and heat shrinkages is not more than 20%.

A magnetic recording medium of floppy disk using the film according to the present invention as a base film is obtained by a known method of forming a magnetic layer on the surface of the film, for example, by applying magnetic particles together with a binder to the surface of the film of the present invention, or by coating the surface thereof with magnetic metal by means of vacuum evaporation, sputtering, or plating.

The present invention will be explained in more detail with reference to the non-limilative following examples. The F-5 values, Young's moduli, and the heat shrinkages of Examples were measured as follows.

(1) F-5 Value

The value is represented by the tensile stress measured by elongating a film sample of 10 mm wide by 5% by a tensile tester with the space between chucks of 100 mm at a pulling speed of 20 mm/min at a temperature of 25° C.

(2) Young's modulus

Young's modulus is represented by an initial modulus in tension measured by stretching a film sample of 10 mm wide with the space between chucks of 100 mm at a pulling speed of 20 mm/min at a temperature of 25° C.

(3) Heat shrinkage

Heat shrinkage was measured by subjecting a sample to heat treatment at 150° C. for 1 hour in a non-stretched state in an oven. The heat shrinkage is represented by $[(l_0 - l)/l_0] \times 100$ (%), wherein $l_0$ is the original length and $l$ is the measured length.

(4) Center line average roughness (Ra: μm)

The surface roughness was obtained in the following way by using a surface roughness measuring machine (SE - 3FK) produced by Kosaka Kenkyusho. The radius of the tip of the contact needle was 2 μm, and the load was 30 mg. From the surface curve of the film, a portion of a length of L (2.5 mm) was sampled along the direction of the center line. The roughness curve is represented by y=f(x) by assuming the center line of the sampled portion as the axis X and the direction perpendicular thereto as the axis, Y, and the surface roughness (μm) is obtained from the following formula:

$$Ra = \frac{1}{L} \int_0^L |f(x)| dx$$

Values above 80 μm were cut off. Ra was obtained by the average value at 5 points in the machine direction and 5 points in the transverse direction, namely, at 10 points in total.

(5) Number of coarse protuberances

The film was placed under crossed Nicols and observed in 10x magnification. The shining fish-eye portions were marked and the height of each of the fish-eye portions was measured by a double beam method. The number of the protuberances having a height of not less than 1.08 μm was counted with respect to 25 cm².

EXAMPLE 1

Polyethylene-2,6-naphthalate containing 0.3 wt % titanium oxide having a primary particle diameter of 0.3 μm were extruded by an extruder, and brought into contact with a casting drum by an electrostatic cooling method, thereby obtaining an unstretched film. At this time, the polymer was filtered through a filter of 2000 mesh.

The unstretched film was stretched in the machine direction by 3.9 times at 130° C., and in the transverse direction by 4.0 times at 140° C. Thereafter, it was heatset at 230° C. for 5 seconds to obtain a film 75 μm in thickness. The physical properties of the film obtained are shown in Table 1.

The physical properties of this film is very well, but the filter must be replaced more frequently than that of the other examples.

COMPARATIVE EXAMPLE 1

A film of 75 μm thick was obtained in the same way as in Example 1 except that the film was stretched in the machine direction by 4.7 times and in the transverse direction by 3.0 times. The physical properties of the film obtained are shown in Table 1.

COMPARATIVE EXAMPLE 2

A film of 75 μm thick was obtained in the same way as in Example 1 except that the filter mesh was replaced to 100 mesh from 2000 mesh.

The physical properties of the film obtained are shown in Table 1.

EXAMPLE 2

Polyethylene-2,6-naphthalate (polymer A) containing 0.3 wt % titanium oxide having a primary particle diameter of 0.3 μm and a polyethylene-2,6-naphthalate (polymer B) containing substantially no particles were separately co-extruded by separate extruders to form a three-layered unstretched film comprising the surface layers of the polymer A and the intermediate layer of the polymer B. The ratio of thickness of each layer was 10:55:10. A filter of 2,000 mesh was used in the extruder for the polymer A and a filter of 500 mesh in the extruder for the polymer B. The frequency at which the filters were replaced was low and continuous production of an unstretched film was enabled. After the unstretched film was stretched in the machine direction by 3.9 times at 130° C. and in the transverse direction by 3.8 times at 140° C., the film was heatset at 245° C. for 10 seconds to obtain a film of 75 μm thick. The physical properties of the film are shown in Table 1.

EXAMPLE 3

Polyethylene-2,6-naphthalate (polymer C) containing 0.2 wt % carbon black having a primary particle diameter of 0.02 μm which had been passed through a filter and a polymer A obtained in Example 2 were separately extruded, and a 75 μm thick biaxially oriented film comprising the surface layers of the polymer A and the intermediate layer of the polymer C (in a thickness ratio of 10:55:10) was produced in the same way as in Example 2. The physical properties of the film are shown in Table 1. They were the same as those of the film in Example 2 except that the light-screening at 900 nm was 70%.

COMPARATIVE EXAMPLE 3

A biaxially oriented film was obtained in the same way as in Example 2 except that the film was stretched in the machine direction by 3.4 times and restretched in the transverse direction by 4.5 times. The physical properties of the film obtained are shown in Table 1.

TABLE 1

|  |  | Ex. 1 | Comp. Ex. 1 | Comp. Ex. 2 | Ex. 2 | Ex. 3 | Comp. Ex. 3 |
| --- | --- | --- | --- | --- | --- | --- | --- |
| Tensile Stress at 5% Elongation (F-5 Value) (kg/mm²) | 0° | 15.2 | 18.5 | 15.2 | 15.2 | 15.2 | 14.0 |
|  | 45° | 15.5 | 16.3 | 15.5 | 15.3 | 15.3 | 16.5 |
|  | 90° | 15.7 | 14.3 | 15.7 | 15.5 | 15.5 | 18.5 |
|  | Deviation in Plane (%) | 3 | 23 | 3 | 2 | 2 | 2.4 |
| Young's Modulus (kg/mm²) | 0° | 610 | 700 | 610 | 610 | 610 | 550 |
|  | 45° | 625 | 500 | 625 | 615 | 615 | 750 |
|  | 90° | 650 | 450 | 650 | 620 | 620 | 830 |
|  | Deviation in Plane (%) | 6.6 | 50 | 6.6 | 1.6 | 1.6 | 33 |
| Heat Shrinkage (%) | 0° | 1.9 | 2.3 | 1.9 | 1.0 | 1.0 | 1.1 |
|  | 45° | 2.0 | 1.5 | 2.0 | 1.1 | 1.1 | 2.2 |
|  | 90° | 2.0 | 1.0 | 2.0 | 1.2 | 1.2 | 2.8 |
|  | Deviation in Plane (%) | 5 | 57 | 5 | 17 | 17 | 61 |
| Center Line Average Roughness Ra (μm) |  | 0.006 | 0.006 | 0.006 | 0.006 | 0.006 | 0.006 |
| Number of Coarse |  | 3 | 3 | 150 | 3 | 3 | 4 |

TABLE 1-continued

|  | Ex. 1 | Comp. Ex. 1 | Comp. Ex. 2 | Ex. 2 | Ex. 3 | Comp. Ex. 3 |
|---|---|---|---|---|---|---|
| Protuberances (per 25 cm²) | | | | | | |

Here, magnetically soft layer of Permalloy (Ni-Fe alloy) having an average thickness of 3,000 Å was formed by sputtering onto both surfaces of each of the films obtained in Examples 1 to 3, respectively, and a vertical magnetic layer comprising 20% Cr-Co alloy having an average thickness of 5,000 Å was next formed by sputtering onto those layers, thereby obtaining a floppy disk. The films obtained in Examples 1 to 3 were not affected by heat during production of the floppy disk, and the produced disks had large outputs and few drop outs, and since these disks had little anisotropy in a plane, it was possible to increase the track recording density. Thus, the disks were suitable for high-density magnetic recording. When these floppy disks according to the present invention were compared with a conventional 3.5-inch high-density floppy disk which uses a polyethylene terephthalate as a base film, the recording density of the former was about 10 times as high as that of the latter.

In contrast, the floppy disk produced from the films obtained in the Comparative Examples 1 and 3 had so large anisotropy in a plane that it was impossible to increase the track recording density and therefore the films obtained in the Comparative Examples 1 and 3 were unsuitable for high-density magnetic recording of floppy disks.

And the floppy disk produced from the film obtained in the Comparative Example 2 had s large coarse protuberances that the number of drop outs greatly increased and therefore it was also unsuitable for high-density magnetic recording of floppy disks.

And then, the formation of the layer of permalloy and the layer of Cr-Co was attempted onto the surfaces of commercially available polyethylene terephthalate film (thickness: 75 μm) and polyimide film (thickness: 75 μm) in the same way as above. Since the polyethylene terephthalate film had a low heat resistance and blooming of olygomers occurred, the productivity was unpractically low. As to the polyimide film, the absorbed water made it impossible to obtain a high vacuum and good bonding strength between the magnetic layer and the film. In addition, the smoothness of the surfaces was not good, so that a film suitable for highdensity magnetic recording was not obtained.

COMPARATIVE EXAMPLE 4

When a biaxially oriented film of 75 μm thick was produced in the same way as in Example 2 except that a filter of 500 mesh was used in the extruder for the polymer A, breakage of film frequently occurred. The film obtained had as many as 120 coarse protrusions of not lower than 1.08 μm per 25 cm², and the number of drop outs greatly increased. This film was unusable as a magnetic disk.

COMPARATIVE EXAMPLE 5

When a biaxially oriented film of 75 μm thick was produced in the same way as in Example 2 except that only a polyethylene-2,6-naphthalate containing 0.4 wt % calcium carbonate having a primary particle diameter of 0.8 μm was filtered through a filter of 1,500 mesh to form a singlelayer unstretched film, the filter was clogged too immediately to enable a continuous film formation. The Ra of the film was 0.021 μm. The floppy disk produced from this fil.m in the same way as above had a very low output.

What is claimed is:

1. A biaxially oriented three-layered polyethylene naphthalate film of not less than 30 μm in thickness for high-density magnetic recording media of floppy disks, which comprises a polyethylene naphthalate intermediate layer and two polyethylene naphthalate surface layer containing 0.01 to 1 wt. % inactive fine particles having a primary particle diameter of 0.001 to 1.5 μm, and has a tensile stress at 5% elongation in the range of 13 to 21 kg/mm² in any direction on the film, a Young's modulus in the range of 500 to 800 kg/mm² in any direction on the film, a heat shrinkage of less than 2.5% in any direction, a center line average roughness Ra of not more than 0.012 μm and not more than 10 coarse protuberances of not lower than 1.08 μm high per 25 cm², and each of the deviations of said tensile stresses at 5% elongation, Young's moduli and heat shrinkages is not more that 20%.

2. The polyethylene naphthalate film according to claim 1, wherein said intermediate layer contains 0.1 to 3 wt. % carbon black.

3. The polyethylene naphthalate film according to claim 1, wherein said film is produced by a process comprising the steps of:
    forming a laminated film which comprises a polyethylene naphthalate intermediate layer and two polyethylene naphthalate surface layers containing 0.01 to 1 wt. % inactive fine particles having a primary particle diameter of 0.00 to 1.5 μm by co-extruding,
    stretching said laminated film in the machine direction by 3.5 to 5.0 times its original length at a temperature 130° to 170? C.,
    stretching the monoaxially stretched film in the transverse direction by 3.5 to 5.0 times its original width at a ratio of 95 to 105% of that in the machine direction at a temperature of 130° to 180? C., and
    heatsetting the biaxially stretched film at a temperature of 180° to 270? C. for 1 second to 10 minutes.

4. The polyethylene naphthalate film according to claim 3, wherein said intermediate layer contains 0.1 to 3 wt. % carbon black.

5. The polyethylene naphthalate film according to claims 1 or 3, wherein said inactive fine particle is at least one selected from the group consisting of fine particles of kaolin, talc, silica, magnesium carbonate, calcium carbonate, barium carbonate, calcium sulfate, barium sulfate, lithium phosphate, calcium phosphate, magnesium phosphate, aluminum oxide, silicon oxide, titanium oxide, lithium fluoride, carbon blacks and Ca, Ba, Zn and Mn salts of terephthalic acid.

6. A process for producing a biaxially oriented three-layered polyethylene naphthalate film of not less than 30 μm in thickness for high-density magnetic recording media of floppy disks which has a tensile stress at 5% elongation in the range of 13 to 21 kg/mm² in any direction on the film, a Young's modulus in the range of 500 to 800 kg/mm² in any direction on the film, a heat shrinkage of less than 2.5% in any direction, a center line average roughness Ra of not more than 0.012 μm and not more than 10 coarse protuberances of not lower than 1.08 μm high per 25 cm$^2$, and each of the deviations of said tensile stresses at 5% elongation, Young's moduli and heat shrinkages is not more that 20%, comprising the steps of:

forming a laminated film which comprises a polyethylene naphthalate intermediate layer and two polyethylene naphthalate surface layer containing 0.01 to 1 wt. % inactive fine particles having a primary particle diameter of 0.001 to 1.5 μm by co-extruding, stretching said laminated film in the machine direction by 3.5 to 5.0 times its original length at a temperature of 130° to 170° C., stretching the monoaxially stretched film in the transverse direction by 3.5 to 5.0 times its original width at a ratio of 95 to 105% of that in the machine direction at a temperature of 130° to 80° C., and heatsetting the biaxially stretched film at a temperature of 180° to 270° C. for 1 second to 10 minutes.

7. The process according to claim 6, wherein said intermediate layer contains 0.1 to 3 wt. % carbon black.

8. The process according to claims 6 or 7, wherein said inactive fine particle is at least one selected from the group consisting of the fine particles of kaolin, talc, silica, magnesium carbonate, calcium carbonate, barium carbonate, calcium sulfate, barium sulfate, lithium phosphate, calcium phosphate, magnesium phosphate, aluminum oxide, silicon oxide, titanium oxide, lithium fluoride, carbon blacks and Ca, Ba, Zn and Mn salts of terephthalic acid.

9. A floppy disk comprising a biaxially oriented three-layered polyethylene naphthalate film according to claim 1 and a magnetic layer formed thereon.

10. A floppy disk comprising a biaxially oriented three-layered polyethylene naphthalate film produced by the process according to claim 6 and a magnetic layer formed thereon.

11. A floppy disk comprising a biaxially oriented three-layered polyethylene naphthalate film produced by the process according to claim 7 and a magnetic layer formed thereon.

* * * * *

UNITED STATES PATENT AND TRADEMARK OFFICE
CERTIFICATE OF CORRECTION

PATENT NO. : 4,876,137
DATED : October 24, 1989
INVENTOR(S) : Shigeo UTSUMI It is certified that error appears in the above-identified patent and that said Letters Patent is hereby corrected as shown below:

Column 9, line 6, "$Ra = \frac{1}{L} \quad \begin{smallmatrix} L \\ 0 \end{smallmatrix} |f(dx)|dx$" should read $$--Ra = \frac{1}{L} \int_0^L |f(dx)|dx--.$$

COLUMN 12:
Claim 1, line 6, "layer" should read --layers--.
COLUMN 12:
Claim 3, line 8, "0.00" should read --0.001--;

line 11, "170?C" should read --170°C--;

line 15, "180?C" should read --180°C--;

line 17, "270?C" should read --270°C--.

COLUMN 13:
Claim 6, line 17, "layer" should read --layers--;

line 27, "80°C" should read --180°C--.

Signed and Sealed this

Thirtieth Day of June, 1992

Attest:

DOUGLAS B. COMER

*Attesting Officer*       *Acting Commissioner of Patents and Trademarks*